United States Patent [19]

Ohta et al.

[11] 4,438,256
[45] Mar. 20, 1984

[54] COPOLYAMIDE ACID AND COPOLYIMIDE

[75] Inventors: Takayuki Ohta, Tokyo; Yukio Yanaga; Seiichi Hino, both of Yokohama, all of Japan

[73] Assignee: Mitsubishi Chemical Industries, Limited, Tokyo, Japan

[21] Appl. No.: 482,417

[22] Filed: Apr. 6, 1983

[30] Foreign Application Priority Data

Apr. 24, 1983 [JP] Japan ................. 57-69145

[51] Int. Cl.³ ............................. C08G 73/10
[52] U.S. Cl. ........................... 528/188; 528/353
[58] Field of Search ...................... 528/188, 353

[56] References Cited

U.S. PATENT DOCUMENTS

| | | | |
|---|---|---|---|
| 3,179,630 | 4/1965 | Endrey | 528/188 |
| 3,179,632 | 4/1965 | Hendrix | 528/188 |
| 3,415,782 | 12/1968 | Irwin et al. | 528/188 |
| 3,424,718 | 1/1969 | Angelo | 528/188 |
| 3,870,677 | 3/1975 | Farrissey, Jr. | 528/188 |
| 4,269,968 | 5/1981 | Duran et al. | 528/188 |
| 4,358,581 | 11/1982 | Sutton, Jr. | 528/188 |
| 4,378,400 | 3/1983 | Makino et al. | 528/188 |

FOREIGN PATENT DOCUMENTS

| | | |
|---|---|---|
| 36-109999 | 7/1961 | Japan . |
| 37-97 | 1/1962 | Japan . |
| 37-10945 | 8/1962 | Japan . |
| 38-8250 | 6/1963 | Japan . |

*Primary Examiner*—Lester L. Lee
*Attorney, Agent, or Firm*—Oblon, Fisher, Spivak, McClelland & Maier

[57] ABSTRACT

A copolyamide acid comprising repeating units represented by the general formulas:

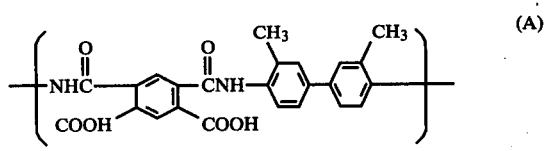

and

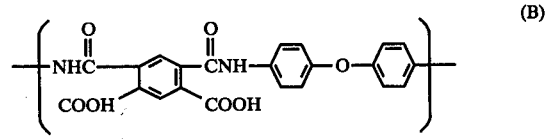

in which the repeating unit (A) and the repeating unit (B) are present in a molar ratio from 20:80 to 80:20, and which has a logarithmic viscosity number ($\eta_{inh}$) of 0.5 dl/g—10 dl/g measured in N,N-dimethylformamide at a concentration of 0.5 g/dl and at a temperature of 30° C. and a copolyimide comprising repeating units represented by the general formulas:

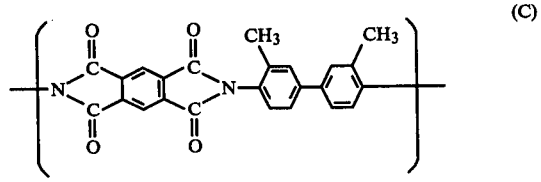

and

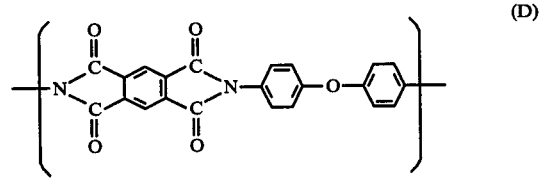

in which the repeating unit (C) and the repeating unit (D) are present in a molar ratio from 20:80 to 80:20 and which has a logarithmic viscosity number ($\eta_{inh}$) of o.5 dl/g—10 dl/g measured in 97% concentrated sulfuric acid at a concentration of 0.5 g/dl and at a temperature of 30° C.

5 Claims, 2 Drawing Figures

COPOLYAMIDE ACID AND COPOLYIMIDE

BACKGROUND OF THE INVENTION

1. Field of the Invention

This invention concerns a copolyamide acid and a copolyimide of a novel structure having extremely high heat resistance, elasticity and strength.

2. Description of the Prior Art

There is known a copolyimide which is produced by copolymerizing pyromellitic anhydride and 4,4'-diaminodiphenyl ether (Japanese Patent Publication No. 10945/1962).

However, this copolyimide does not have sufficient elastic modulus and strength, and there is a continuing need for a copolyimide having high elastic modulus and strength.

SUMMARY OF THE INVENTION

This invention resides in a copolyamide acid comprising the repeating units represented by the general formulas:

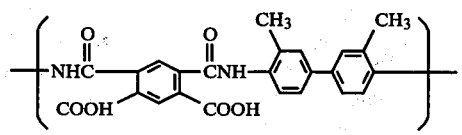

(A)

and

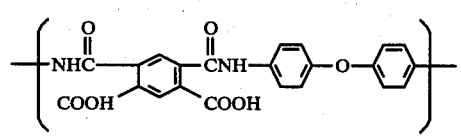

(B)

in which the repeating unit (A) and the repeating unit (B) are present in a molar ratio from 20:80 to 80:20, and which has a logarithmic viscosity number ($\eta_{inh}$) of 0.5 dl/g—10 dl/g measured in N,N-dimethylformamide at a concentration of 0.5 g/dl and at a temperature of 30° C., as well as a copolyimide comprising repeating units represented by the general formulas:

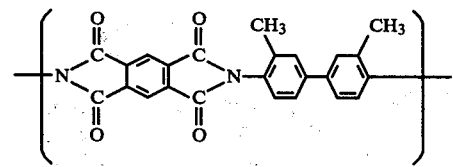

(C)

and

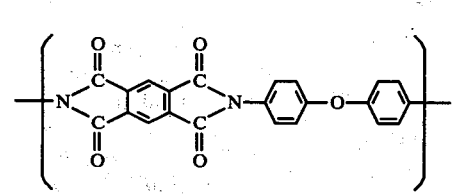

(D)

in which the repeating unit (C) and the repeating unit (D) are present in a molar ratio from 20:80 to 80:20, and which has a logarithmic viscosity number ($\eta_{inh}$) of 0.5 dl/g—10 dl/g measured in 97% concentrated sulfuric acid at a concentration of 0.5 g/dl and at a temperature of 30° C.

DETAILED DESCRIPTION OF THE PREFERRED EMBODIMENTS

Figure 1:
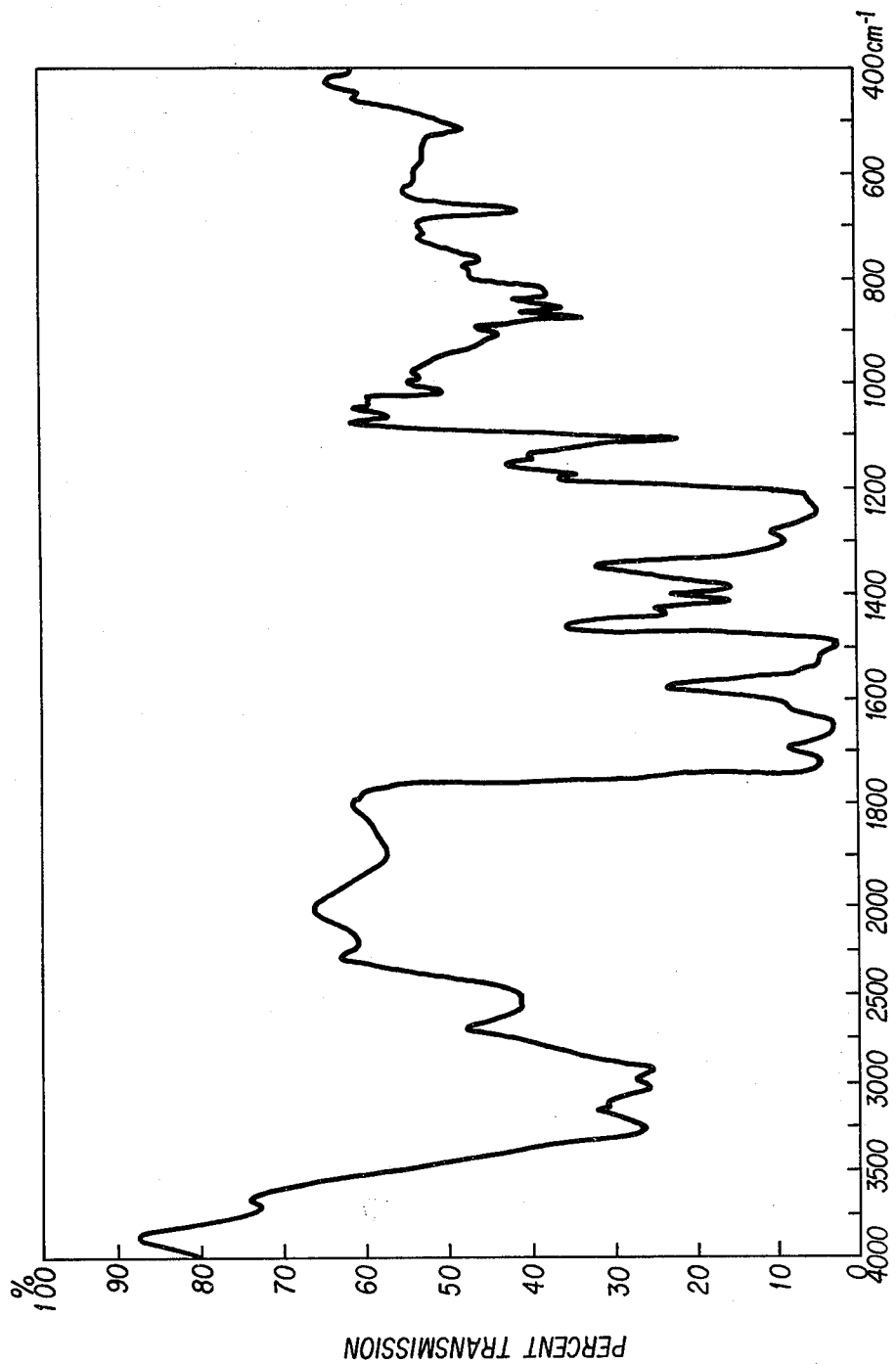
FIG. 1 is an IR absorption spectrum chart for the polyamide acid according to this invention obtained in Example 2.

This invention is described specifically below.

The copolyamide acid according to this invention is prepared by charging, to pyromellitic anhydride (hereinafter referred to as ingredient (a)), 3,3'-dimethylbenzidine (hereinafter referred to as ingredient (b)) and 4,4'-diaminodiphenyl ether (hereinafter referred to as ingredient (c)) such that the total amount of the ingredient (b) and the ingredient (c) is substantially equal in molar amount to the amount of the ingredient (a), and the molar ratio of the ingredient (b) to the ingredient (c) is from 20:80 to 80:20, and then reacting them in an organic solvent at a low temperature. The copolyimide according to this invention is prepared by imidizing the copolyamide acid prepared as above by a conventional process.

The reaction between the ingredient (a) and the ingredients (b) and (c) is preferably carried out in a mixed solvent of one or more of organic solvents, for example, amides such as N,N-dimethylformamide, N,N-dimethylacetoamide and N,N-dimethylpropionamide, pyrrolidones such as N-methyl-2-pyrrolidone and 1,5-dimethyl-2-pyrrolidone, and phenols such as phenol, p-chlorophenol, o-chlorophenol with one or more of solvent such as dimethylsulfoxide and trichloroethane.

The first reaction step for preparing the polyamide acid is preferably carried out at a relatively lower temperature, for example, at a temperature not more than 50° C. and the reaction may, generally, be carried out by maintaining a solution prepared by dissolving the ingredients (b) and (c) in an appropriate organic solvent under a cooled state and adding the ingredient (a) to the solution.

The solution of the polyamide acid obtained in this way can be imidized in various methods. They include, for instance:

(i) method of imidization by dehydrating the solution as it is under heating, (ii) a method of casting the solution of the polyamide acid on a glass plate or the like and, thereafter, imidizing the same by dehydration under heating, (iii) a method of adding to admix an imidization catalyst such as a tertiary amine and an acid anhydride to the solution of the polyamide acid and, thereafter, casting the same on a glass plate or the like and then imidizing the same by dehydration at room temperature or under heating, (iv) a method of charging the solution into a great amount of acetone or like other poor solvent and imidizing the precipitated and filtered powder by drying under heating, and (v) a method of imidizing the solution by dehydration at room temperature or under heating in an imidization catalyst such as a tertiary amine and an acid anhydride or in an organic solvent containing such catalyst.

It is desired that the copolyimide according to this invention has a high molecular weight required for forming films or other molding products, that is, it has a logarithmic viscosity number $\eta_{inh}$ of at least 0.5 dl/g and, preferably, in the range from 1 dl/g to 5 dl/g measured in 97% concentrated sulfuric acid at a concentration of 0.5 g/dl and at a temperature of 30° C. The logarithmic viscosity number $\eta_{inh}$ is represented by the following formula:

$$\eta_{inh} = ln\ (\eta_{rel})/C,$$

where C represents the concentration of the polymer solution (polymer g/solvent 100 ml) and $\eta_{rel}$ represents a relative viscosity, that is, a measured value defined by the ratio of the flowing periods of the polymer solution to that of the solvent measured by using a capillary viscometer. It is desired that the copolyamide acid has a logarithmic viscosity number ($\eta_{inh}$) in a range between 0.5 dl/g—10 dl/g measured in N,N-dimethylformamide at a concentration of 0.5 g/dl and at a temperature of 30° C. The definition for the logarithmic viscosity number $\eta_{inh}$ is the same as above.

The copolyimide according to this invention comprises the repeating units (C) and (D) as mentioned above in a molar ratio from 20:80 to 80:20 and, preferably, from 30:70 to 70:30. No intended polyimide having a high elastic modulus and a high strength in this invention can be obtained from the units (C) and (D) in the ratio out of the above range as well as from respective single system, as apparent from examples and comparative examples described later. Specifically, if the ratio for (C) is less than the above range, no sufficient improvement can be attained for the elastic modulus and the strength and, while on the other hand, if the ratio for (C) is more than the above range, it only leads to extremely low strength although a high elastic modulus can be obtained. In the same manner, the copolyamide acid according to this invention comprises repeating units (A) and (B) as mentioned above in a molar ratio from 20:80 to 80:20 and, preferably, from 30:70 to 70:30.

The copolyimide according to this invention can be prepared to a film by way of the imidizing method as described above. Further, the copolyimide may be obtained as a powderous product, which is then formed into a molding product by the known method. Furthermore, the copolyimide according to this invention can be formed into fibers or the like since it easily dissolves in concentrated sulfuric acid or fuming sulfuric acid.

The film, particularly, the film with $\eta_{inh}$ of greater than 1.0 dl/g comprising the copolyimide according to this invention has a tensile strength of greater than 25 kg/mm$^2$ and an initial elastic modulus of greater than 400 kg/mm$^2$.

The copolyimide according to this invention may be compounded with well-known compounding agents, for example, antioxidant, heat stabilizer, UV-absorber, pigment and filler by the procedures known per se.

Having generally described this invention, a more complete understanding can be obtained by reference to certain examples which are provided herein for purposes of illustration only and are not intended to be limiting in any manner.

The physical properties of the film were evaluated by the following procedures.

Tensile Test: Measured at 20° C. according to the method specified in the test method of ASTM D638.
Glass Transition Point (hereinafter referred to as TG):
Temperature rising rate of 10° C./min using a thermomechanical analyzer manufactured by Shimazu Seisakusho Ltd.

EXAMPLE 1

Into a 500 ml four-necked flask equipped with a thermometer and a stirrer, were accurately weighed 6.6 g of 4,4'-diaminodiphenyl ether (hereinafter referred to as ODA) and 3.0 g of 3,3'-dimethylbenzidine (hereinafter referred to as OTD), to which were added to dissolve 80 ml of N,N'-dimethylformamide (hereinafter referred to as DMF). Then, 10.3 g of pyromellitic anhydride (hereinafter referred to as PMDA) were added and brought to reaction at room temperature for 5 hours. Since the viscosity of the solution increased as the reaction proceeded, the solution was diluted with DMF to finally obtain a solution of 12% by weight of amide acid copolymer with OTD/ODA=30/70 (molar ratio). A portion of the solution was diluted in DMF to prepare a solution at a concentration of 0.5 g/dl and the logarithmic viscosity number was measured to be 2.5 dl/g. Upon IR absorption spectroscopy, absorption of amide acid (NH) was recognized at 3,280 cm$^{-1}$.

The solution of the polyamide acid was coated on a glass plate to form a thin film using a doctor knife and then dried in a hot-air drying furnace at 120° C. for 10 min. Then, the semi-dried film was set to a metal frame, further heated from 120° C. to 250° C. in 15 min and, finally, heat-treated at 350° C. for 4 min to obtain a copolyimide film of 25 μm thickness.

Upon IR absorption spectroscopy for the film, new intense imide absorption was observed at 1,780 cm$^{-1}$ and 730 cm$^{-1}$, while on the other hand, the N-H absorption at 3,280 cm$^{-1}$ completely disappeared.

The film had tensile properties, that is, an elastic modulus of 410 kg/mm$^2$, a strength of 20 kg/mm$^2$ and an elongation at break of 50%. The copolyimide film was dissolved in 97% sulfuric acid to prepare 0.5 g/dl solution and the logarithmic viscosity number thereof was measured to be 1.5 dl/g.

The copolyimide film had Tg of about 350° C.

EXAMPLE 2

A solution of an amide acid polymer with OTD/ODA=50/50 (molar ratio) having a logarithmic viscosity number of 2.5 dl/g was prepared in the same manner as in Example 1 excepting the use of 4.7 g of ODA, 5.0 g of OTD and 10.3 g of PMDA. The solution was poured into a great amount of acetone to precipitate and filter out the polyamide acid, which was dried at 60° C. over 24 hours under vacuum to prepare a powder of polyamide acid. The degree of polymerization was 99.8% measured by weight method. The elementary analysis for the polymer was: C: 63.2%, H: 3.7%, O: 26.3% and N: 6.8%. The theoretical value (repeating unit (A)/(B) equal to 50/50 (molar ratio)) is: C: 63.9%, H: 3.7%, O: 25.9% and N: 6.5%.

While on the other hand, the solution of the polyamide acid was coated in the same manner as in Example 1 on a glass plate to prepare a thin film, dried at 60° C. over 24 hours under vacuum to prepare a film of a polyamide acid. The film still contained about 20% DMF. The IR absorption spectrum for the film is shown in FIG. 1.

Then, a copolyimide film of 27 μm thickness was obtained from the solution of the polyamide acid in the same manner as in Example 1. The film had tensile properties, that is, an elastic modulus of 520 kg/mm$^2$, a strength of 25 kg/mm² and an elongation at break of 40%. The copolyimide had $\eta_{inh}$ of 1.4 dl/g.

The elementary analysis for the copolyimide was:
C: 70.5%, H: 3.0%, O: 19.1% and N: 7.4%. The theoretical value (repeating units (C)/(D)=50/50 (molar ratio)) was:
C: 71.1%, H: 3.0%, O: 19.1% and N: 7.2%.

Figure 2:
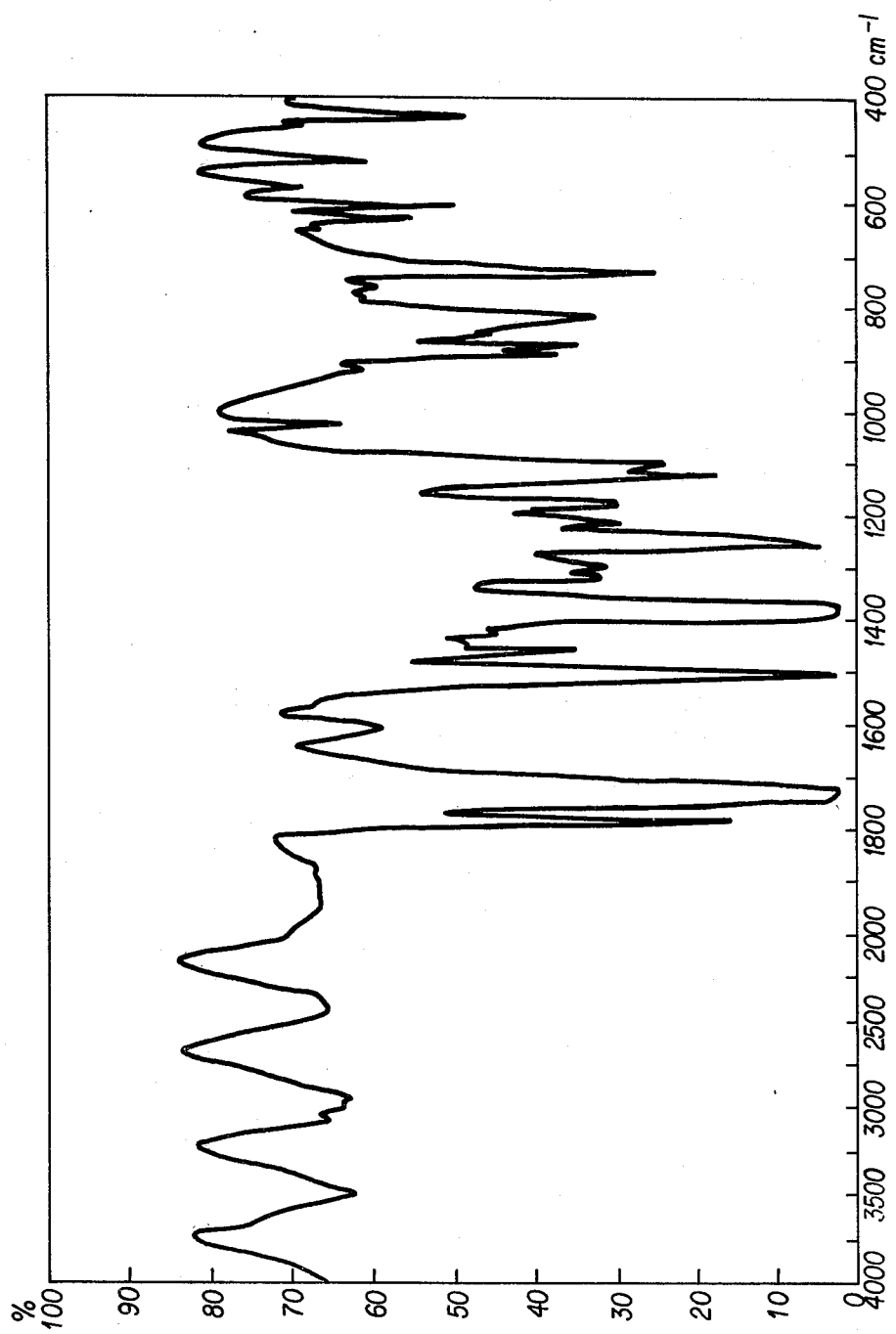
FIG. 2 is an IR absorption spectrum chart for the polyimide according to this invention obtained in Example 2.

The IR absorption spectrum for the copolyimide film of 8 μm thickness prepared in the same manner is shown in FIG. 2.

The copolyimide had Tg of about 400° C.

EXAMPLE 3

From the same solution of the polyamide acid as prepared in Example 2, a thin film was formed on a glass plate by using a doctor knife and it was dried at 120° C. for 10 min in a hot-air drying furnace to obtain a semi-dried film. The film was immersed in a mixed solution of 200 ml of acetic anhydride, 300 ml of pyridine and 500 ml of toluene at room temperature for 20 hours, which was then set on a metal frame in the same manner as in Example 1 and heat-treated to obtain an imide copolymer film of 23 μm thickness.

The film had tensile properties, that is, an elastic modulus of 550 kg/mm², a strength of 27 kg/mm² and an elongation at break of 25%. $\eta_{inh}$ was 1.6 dl/g.

EXAMPLE 4

To the same polyamide acid solution as prepared in Example 2, were added 4 mol of β-picoline and 4 mol of acetic anhydride as catalyst per one mol of pyromellitic unit contained in the polyamide acid, and after mixing well, a film of the copolyimide was obtained in the same manner as in Example 1. The film had tensile properties, that is, an elastic modulus of 650 kg/mm², a strength of 30 kg/mm² and an elongation at break of 60%. $\eta_{inh}$ was 1.7 dl/g.

EXAMPLE 5

A copolyimide film of 27 μm thickness was prepared from a solution of amide acid copolymer of OTD-/ODA=70/30 (molar ratio) having a logarithmic viscosity number of 2.5 dl/g obtained in the same procedure as in Example 1 except for using 2.84 g of ODA, 7.1 OTD and 10.3 g of PMDA.

The film had tensile properties, that is, an elastic modulus of 670 kg/mm², a strength of 25 kg/mm² and an elongation at break of 20%. The copolyimide had $\eta_{inh}$ of 1.4 dl/g.

EXAMPLE 6

To a portion of the same polyamide acid solution as prepared in Example 2, were added 0.6 mol of isoquinoline, and, to another portion of the same polyamide acid placed in a separate vessel, were added 4 mol of acetic anhydride respectively as the catalyst each per one mol of the pyromellitic unit contained in the polyamide acid and each of them was mixed well. Thereafter, the two solutions were continuously mixed in a static mixer using a constant volume pump and the thus mixed polyamide acid solution was placed on a glass plate to form a thin film using a doctor knife in the same manner as in Example 1, which was then dried to obtain a copolyimide film of 50 μm thickness. The film had tensile properties, that is, an elastic modulus of 700 kg/mm², a strength of 33 kg/mm² and an elongation at break of 55%. $\eta_{inh}$ was 2.0 dl/g.

COMPARATIVE EXAMPLE 1

A polyamide acid solution having an intrinsic viscosity number of 2.3 dl/g was obtained in the same procedures as in Example 1 except for using 36.6 g of ODA and 40 g of PMDA.

The film of 27 μm thickness prepared from the solution in the same procedures as in Example 1 had tensile properties, that is, an elastic modulus of 227 kg/mm², a strength of 10 kg/mm² and an elongation at break of 70%. $\eta_{inh}$ was 1.4 dl/g.

COMPARATIVE EXAMPLE 2

A polyamide acid solution having a logarithmic viscosity number of 2.0 dl/g was obtained in the same procedures as in Example 1 except for using 10.0 g of OTD and 10.3 g of PMDA.

A film was prepared from the solution according to the procedures in Example 1, but it was too weak to measure the tensile properties.

COMPARATIVE EXAMPLE 3

A copolyimide film of 25 μm thickness was prepared from a solution of the amide acid copolymer of OTD-/ODA=1/9 (molar ratio) having a logarithmic viscosity number of 2.7 dl/g obtained in the same procedures as in Example 1 except for using 8.5 g of ODA, 1.0 g of OTD and 10 g of PMDA.

The film had tensile properties, that is, an elastic modulus of 250 kg/mm², a strength of 13 kg/mm² and an elongation at break of 60%. The copolyimide had $\eta_{inh}$ of 1.6 dl/g.

COMPARATIVE EXAMPLE 4

A copolyimide film of 26 μm thickness was prepared from a solution of amide acid copolymer of OTD-/ODA=9/1 (molar ratio) having a logarithmic viscosity number of 2.4 dl/g obtained in the same procedures as in Example 1 excepting the use of 0.94 g of ODA and 9.0 g of OTD.

The film had tensile properties, that is, an elastic modulus of 600 kg/mm², a strength of 3 kg/mm² and an elongation at break of 2%. The copolyimide had $\eta_{inh}$ of 1.4 dl/g.

Having now fully described the invention, it will be apparent to one of ordinary skill in the art that many changes and modifications can be made thereto without departing from the spirit of the invention as set forth herein.

What is claimed as new and intended to be covered by Letters Patent is:

1. A copolyamide acid consisting essentially of repeating units represented by the general formulas:

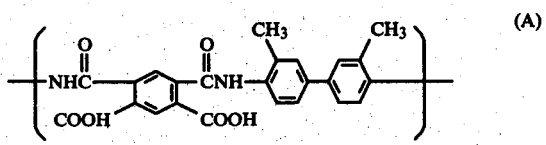

and

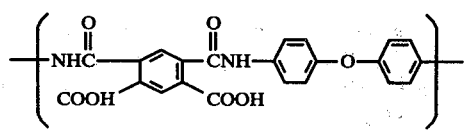

(B)

in which the repeating unit (A) and the repeating unit (B) are present in a molar ratio from 20:80 to 80:20, and which has a logarithmic viscosity number ($\eta_{inh}$) of 0.5 dl/g—10 dl/g measured in N,N-dimethylformamide at a concentration of 0.5 g/dl and at a temperature of 30° C.

2. A copolyimide consisting essentially of repeating units represented by the general formulas:

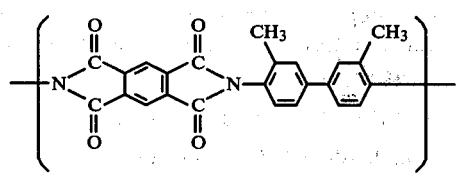

(C)

and

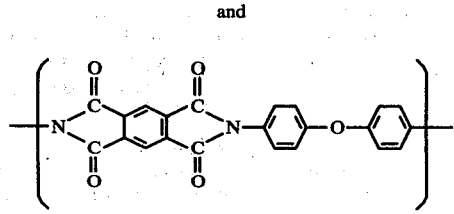

(D)

in which the repeating unit (C) and the repeating unit (D) are present in a molar ratio from 20:80 to 80:20 and which has a logarithmic viscosity number ($\eta_{inh}$) of 0.5 dl/g—10 dl/g measured in 97% concentrated sulfuric acid at a concentration of 0.5 g/dl and at a temperature of 30° C.

3. The copolyamide acid of claim 1 wherein the molar ratio of repeating units (A) to (B) is from 30:70 to 70:30.

4. The copolyimide of claim 2 wherein the molar ratio of repeating units (C) to (D) is from 30:70 to 70:30.

5. The copolyimide of claim 2 wherein the logarithmic viscosity number $\eta_{inh}$ is in the range from 1 dl/g to 5 dl/g measured in 97% concentrated sulfuric acid at a concentration of 0.5 g/dl and at a temperature of 30° C.

* * * * *

UNITED STATES PATENT AND TRADEMARK OFFICE
CERTIFICATE OF CORRECTION

PATENT NO. : 4,438,256

DATED : March 20, 1984

INVENTOR(S) : Takuyuki Ohta et al

It is certified that error appears in the above-identified patent and that said Letters Patent is hereby corrected as shown below:

On the title page item /30/ should read

--[30] Apr. 24, 1982 [JP] . . . . . . . . . . 57-69145 --

Signed and Sealed this

Nineteenth Day of June 1984

[SEAL]

Attest:

GERALD J. MOSSINGHOFF

Attesting Officer

Commissioner of Patents and Trademarks